(12) United States Patent
Moretti et al.

(10) Patent No.: US 12,049,964 B2
(45) Date of Patent: Jul. 30, 2024

(54) MICROMETRIC VALVE ACTUATOR DEVICE FOR GAS PRESSURE CONTROL

(71) Applicant: Petróleo Brasileiro S.A.—Petrobras, Rio de Janeiro (BR)

(72) Inventors: Artur Lemes Moretti, Mirangá (BR); Leonardo Brunelli do Nascimento, Mirangá (BR); Leonardo Hadlich de Oliveira, Mirangá (BR); Fernando Franco Queiroz, Mirangá (BR); Jailton Ferreira do Nascimento, Rio de Janeiro (BR); João Lourenço Castagnari William Pimenta, Mirangá (BR); Pedro Augusto Arroyo, Mirangá (BR)

(73) Assignee: Petróleo Brasileiro S.A.—Petrobras (BR)

( * ) Notice: Subject to any disclaimer, the term of this patent is extended or adjusted under 35 U.S.C. 154(b) by 10 days.

(21) Appl. No.: 17/839,920

(22) Filed: Jun. 14, 2022

(65) Prior Publication Data
US 2022/0397209 A1 Dec. 15, 2022

(51) Int. Cl.
*F16K 31/04* (2006.01)
*B01D 53/04* (2006.01)
(Continued)

(52) U.S. Cl.
CPC ........ *F16K 31/047* (2013.01); *B01D 53/0446* (2013.01); *B01D 53/0454* (2013.01);
(Continued)

(58) Field of Classification Search
CPC .... F16K 31/043; F16K 31/047; F16K 31/465; F16K 31/467; F16K 31/04; F16K 37/005; G05D 16/202; Y02C 20/40
(Continued)

(56) References Cited

U.S. PATENT DOCUMENTS 1,791,012 A * 2/1931 Ray ........................... F23K 5/04
   417/310
3,581,984 A * 6/1971 Buechner .............. G05B 11/011
   236/12.12
(Continued)

FOREIGN PATENT DOCUMENTS

WO   WO-2014024377 A1 * 2/2014 ............... B62D 3/02

OTHER PUBLICATIONS

Translation of WO-2014024377, Feb. 2014, Nakashima.*
(Continued)

*Primary Examiner* — William M McCalister
(74) *Attorney, Agent, or Firm* — Mintz, Levin, Cohn, Ferris, Glovsky and Popeo, P.C.

(57) ABSTRACT

The present invention addresses to a device that allows the control of the gas pressure at the outlet of a fixed bed adsorption equipment operated at high pressures, by means of the actuation of a micrometric valve (6), wherein the valve must be located downstream of the equipment. The valve actuation takes place by means of a stepper motor (1), controlled by a microcontroller board (22), which connects to the valve shaft by means of a system of pulleys (2, 5) and belt (3). The present invention is applied in adsorption units, in which other gases are present, by altering the tuning parameters of the PID controller or even being used in a liquid medium or gas-liquid two-phase flow.

7 Claims, 4 Drawing Sheets

Figure 3

— Gas stream flow
⋯ Signal flow
⋯⋯ Electric current

(51) Int. Cl.
  *F16K 31/46*  (2006.01)
  *F16K 37/00*  (2006.01)
  *G05D 16/20*  (2006.01)

(52) U.S. Cl.
  CPC ......... *F16K 31/465* (2013.01); *G05D 16/202* (2013.01); *F16K 37/005* (2013.01); *Y02C 20/40* (2020.08)

(58) Field of Classification Search
  USPC .................. 251/129.11, 129.12, 129.13; 137/356–373, 487.5
  See application file for complete search history.

(56) References Cited

U.S. PATENT DOCUMENTS

| | | | | |
|---|---|---|---|---|
| 3,651,711 | A * | 3/1972 | Greenwood | F16H 25/20 74/625 |
| 3,972,506 | A * | 8/1976 | Azuma | F16K 31/05 251/129.11 |
| 4,036,256 | A * | 7/1977 | Bublitz | C03B 9/406 137/595 |
| 4,417,312 | A * | 11/1983 | Cronin | G01M 3/2807 700/282 |
| 4,840,349 | A * | 6/1989 | Peter | F02D 11/10 251/294 |
| 5,865,272 | A * | 2/1999 | Wiggins | F16K 31/047 74/89.31 |
| 6,178,997 | B1 * | 1/2001 | Adams | G05D 16/2095 137/492.5 |
| 6,206,024 | B1 * | 3/2001 | Naberhaus | F16K 27/067 251/308 |
| 6,646,395 | B2 * | 11/2003 | Reimann | F02D 9/1065 318/400.42 |
| 6,802,488 | B1 * | 10/2004 | Patterson | F16K 1/123 251/267 |
| 6,994,311 | B2 * | 2/2006 | Duelli | F16K 31/04 251/266 |
| 7,025,329 | B2 * | 4/2006 | Winter | F16K 31/047 251/903 |
| 7,059,338 | B1 * | 6/2006 | Kincaid | F16K 37/0091 137/552 |
| 7,603,823 | B2 * | 10/2009 | Cann | E04C 2/36 52/302.1 |
| 8,066,474 | B1 * | 11/2011 | Jansen | F01D 17/16 91/363 R |
| 8,118,276 | B2 * | 2/2012 | Sanders | G05B 19/39 137/554 |
| 8,740,181 | B2 * | 6/2014 | Prieto Barranco | F16K 37/0083 137/554 |
| 8,887,746 | B2 * | 11/2014 | Schon | A61M 16/104 251/96 |
| 9,447,890 | B2 * | 9/2016 | Jennings | G05D 16/063 |
| 10,399,031 | B2 * | 9/2019 | Shreve | B01D 15/163 |
| 10,451,049 | B2 * | 10/2019 | Yamamoto | F04B 39/064 |
| 10,690,570 | B1 * | 6/2020 | St Amant, III | G01N 1/4022 |
| 2001/0010365 | A1 * | 8/2001 | Iwabuchi | F16K 41/10 251/64 |
| 2004/0079913 | A1 * | 4/2004 | Lawson | A61B 5/0809 251/129.11 |
| 2006/0231784 | A1 * | 10/2006 | Quitmeyer | F16K 31/047 251/129.11 |
| 2007/0194261 | A1 * | 8/2007 | Kato | H01M 8/04156 251/129.15 |
| 2008/0105842 | A1 * | 5/2008 | Webster | F16K 11/20 251/180 |
| 2011/0094606 | A1 * | 4/2011 | Kanomata | G05D 16/202 137/487.5 |
| 2013/0284658 | A1 * | 10/2013 | Aylward | F16K 5/04 251/309 |
| 2014/0130882 | A1 * | 5/2014 | Jawidzik | A61M 16/12 137/487.5 |
| 2015/0369093 | A1 * | 12/2015 | Leiber | F01L 9/14 251/30.01 |
| 2018/0058591 | A1 * | 3/2018 | Bohm | F16K 31/5286 |
| 2020/0197856 | A1 * | 6/2020 | Fulton | B01D 53/0446 |
| 2020/0300376 | A1 * | 9/2020 | Obermöller | F16K 31/047 |
| 2021/0102638 | A1 * | 4/2021 | Fulton | F16K 31/1225 |
| 2021/0180713 | A1 * | 6/2021 | Mariano | F16K 31/042 |
| 2022/0397209 | A1 * | 12/2022 | Moretti | B01D 53/0446 |
| 2023/0034890 | A1 * | 2/2023 | Fujiyama | F16K 31/047 |
| 2023/0042418 | A1 * | 2/2023 | Verissimo | F16K 31/047 |

OTHER PUBLICATIONS

Henao-Bravo et al. (2017) "Low-Cost Electronic Opening Control Valve", Tecciencia, 12(22):87-96.

Otero et al. (2020) "Low-Cost Proportional Automatic Control Valve", Process Engineering, Degree Project, pp. 1-10.

* cited by examiner

➡ Gas stream flow

MICROMETRIC VALVE ACTUATOR DEVICE FOR GAS PRESSURE CONTROL

CROSS-REFERENCE TO RELATED APPLICATION

This application claims priority to Brazilian Application No. 10 2021 011549 1, filed on Jun. 14, 2021, and entitled "MICROMETRIC VALVE ACTUATOR DEVICE FOR GAS PRESSURE CONTROL," the disclosure of which is incorporated herein by reference in its entirety.

FIELD OF THE INVENTION

The present invention addresses to a micrometric valve actuator device for gas pressure control with application in adsorption units, in order to allow the study of the dynamics of the adsorption process or reaction in a fixed bed with gases concentrated at higher pressures, varying other process variables, and keeping the pressure constant.

DESCRIPTION OF THE STATE OF THE ART

Currently, although there are several backpressure valves available in the national and international market, their availability is not so high for process equipment that operate at high pressures and low flow rates, since there is required a piece of equipment with an extremely low valve coefficient (VC). In addition, during the fixed bed adsorption process, it is common for the composition of the effluent gas to vary with time, changing the VC of the control element, which can make it impossible to accurately control the pressure inside the equipment.

During the study of the separation of mixtures of $CH_4$+ $CO_2$+$H_2S$, it was ascertained the need for a device that allowed the control of the pressure inside the equipment in a reliable and reproducible way. When using a commercial backpressure valve, it was ascertained that the pressure control was not so efficient, with variations of 5 bar (0,5 MPa) above and below the specified set-point of 50 bar a (5 MPa). This variation is enough to mask the results of the experiments, since it was not clear whether this variation was caused by the adsorption phenomenon, by the temperature increase caused by the adsorption or by the volumetric flow variation caused by the control device.

The use of specialized foreign technology is possible; however, they have high added cost, limited functionality and little technical assistance in the national market. In this way, a robust control element is an important component for the study of processes that involve gas streams at high pressures, high concentrations and with variable composition.

U.S. Pat. No. 6,178,997 presents a complex device that maintains the fluid pressure at a predetermined value, by acting on a throttling element, which is positioned using its own controlled pressure and also by means of an electronic device, which controls the load on the throttling element, allowing fine adjustment of pressure. The device provides the PID control of throttling element positioning, controlled pressure measurement, storage of process control data in the device itself and communication with an external electronic device. Despite enabling pressure control, when there is a variation in the process flow rate, the element presents an off-set of the regulated pressure with the set-point that increases as the flow rate increases.

U.S. Pat. No. 9,447,890 describes a diaphragm-type backpressure pressure regulator that controls the process pressure by using a reference pressure exerted by a fluid. By having the process pressure and the reference pressure exerted in opposite directions on a flow-restricting diaphragm, there is the possibility of controlling the pressure at a variety of desired pressures over a wide range of flow rates. The invention, however, requires a reference pressure, which requires a gas to exert the pressure, and a calibrated measuring element, which may make the pressure control process more expensive.

There is presented in U.S. Pat. No. 7,025,329 an invention that allows the control of the product flow rate in oxygen concentrators, by the actuation of a stepper motor in a needle valve. The stepper motor operating at 48 steps per revolution actuates the needle valve by means of gears, allowing a flow rate resolution of about 0.25 L/min of oxygen when the supply pressure is 10 psig (68,95 kPaG). The invention, however, does not relate to a control system for process flow rate or pressure.

A linear valve actuator based on a direct current electric motor is presented in U.S. Pat. No. 8,118,276. In the invention, the shaft of a valve is positioned by a microcontroller that uses a PID control, for positioning the valve shaft, and another PID control, to control the motor speed. The use of two sensors for feedback control and gear configuration, which transforms the circular motion of the motor into a linear motion, eliminates the need for costly high-precision anti-backlash gears. The invention has the purpose of continuous fine control of the flow rate of fluids as a function of the response of a measured fluid property, which is not specified.

U.S. Pat. No. 4,417,312 presents an electronic controller for valve actuators. The invention compares the signal from the process variable to be controlled to the desired set-point, and then produces a train of electrical pulses that cause the actuator to move incrementally. The presence of deviation in the signal causes the actuator to move, and the polarity of the error determines the direction of movement. The actuator step size varies exponentially to suit the time constant of the process being controlled. In this way, a minimal overshoot and little instability in the process variable are obtained. In this way, a printed circuit is presented to enable an actuator element to open and close a valve in a controlled manner, without specifying the control element or the process.

U.S. Pat. No. 8,740,181 reports a micrometric valve positioning system consisting of a servomotor coupled to the shaft of a micrometric valve by means of a flexible coupling. The valve allows pressure control up to 200 bar (20 MPa) and at a temperature of 205° C. The servomotor is a stepper motor configured to operate at 50,000 steps per revolution. The motor shaft position is measured by means of a potentiometer located on the opposite end of the valve. A bracket is used to hold the motor and valve system in order to align the valve and motor shafts, while the potentiometer is coupled to the motor shaft by means of a gear transmission system. This system was used to control the pressure of 50.0±0.1 bar (5.0±0.01 MPa) of a chemical reactor operating with hydrogen at a flow rate of 50 N·cm³/min. The device, however, limits its operation to controlling the pressure of hydrogen gas at a temperature of 205° C.

In the reference by HENAO, E. et al. (2017) "Low-Cost Electronic Opening Control Valve", Tecciencia, v. 12, p. 87-96, there is presented a functional prototype of hardware and software of a valve that allows the control of the flow rate of water, allowing the adjustment of flow rate until a given set-point. The actuation takes place by means of a stepper motor that connects axially with the valve by means of a metallic bushing. In a gate valve, a fixed bushing is used, while in a needle valve, two guides are used, which allow the vertical displacement. However, such a prototype does not allow operating a control valve in four different ways, as well as limiting the vertical displacement of the valve.

In the paper by OTERO, M. A., TORO, S. B. (2020) "Low-cost proportional automatic contracts valve", Process Engineering, Degree Project, p. 1-10, there is presented a functional prototype, which allows the opening and closing of a proportional valve by means of the use of a cell phone. The actuation is done by means of a stepper motor that is axially coupled to the valve by welding. However, the functional prototype does not allow operating a control valve in four different ways, as well as its coupling does not occur by means of a set of pulleys and toothed belts, which allows the axial displacement of the valve measuring rod. In addition, the device operation is limited to opening and closing the control valve at 0, 25, 50, 75 and 100% of the valve opening, thus regulating the outlet flow rate.

Thus, no document of the state of the art discloses a device that allows the control of the gas pressure at the outlet of a fixed bed adsorption equipment operated at high pressures, by means of the actuation of a micrometric valve such as the one of the present invention.

In order to solve such problems, the present invention was developed, by means of which the device allows the reliable control of the pressure within the adsorption bed, when there is gas flow. In this way, it becomes possible to study the dynamics of the adsorption or reaction process in a fixed bed with gases concentrated at higher pressures, varying other process variables, and keeping the pressure constant.

The present invention discloses a great capability of fine pressure control, even at higher pressures. This capability is achieved by means of the use of parts found in the national territory with great ease, causing the time and cost of maintenance to be drastically reduced. It can be used in any control valve, allowing flexibility in processes involving other gas or liquid mixtures or in the two-phase gas-liquid flow. Furthermore, there is a decrease in operational lacks of control that generate leakage into the atmosphere.

BRIEF DESCRIPTION OF THE INVENTION

The present invention addresses to a device that allows the control of the gas pressure at the outlet of a fixed bed adsorption equipment operated at high pressures, by means of the actuation of a micrometric valve. For the correct functioning of the present invention, the valve must be located downstream of the equipment. The valve is operated by means of a stepper motor, controlled by a microcontroller board, which is connected to the valve shaft by means of a pulley and belt system.

The present invention can be used in adsorption units, in which other gases are present, by changing the tuning parameters of the PID controller, or it even can be used in a liquid medium or two-phase gas-liquid flow. In this case, the specification of the used valve must also be performed, in addition to changing the values of the tuning parameters of the PID controller.

BRIEF DESCRIPTION OF DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

Figure 1:
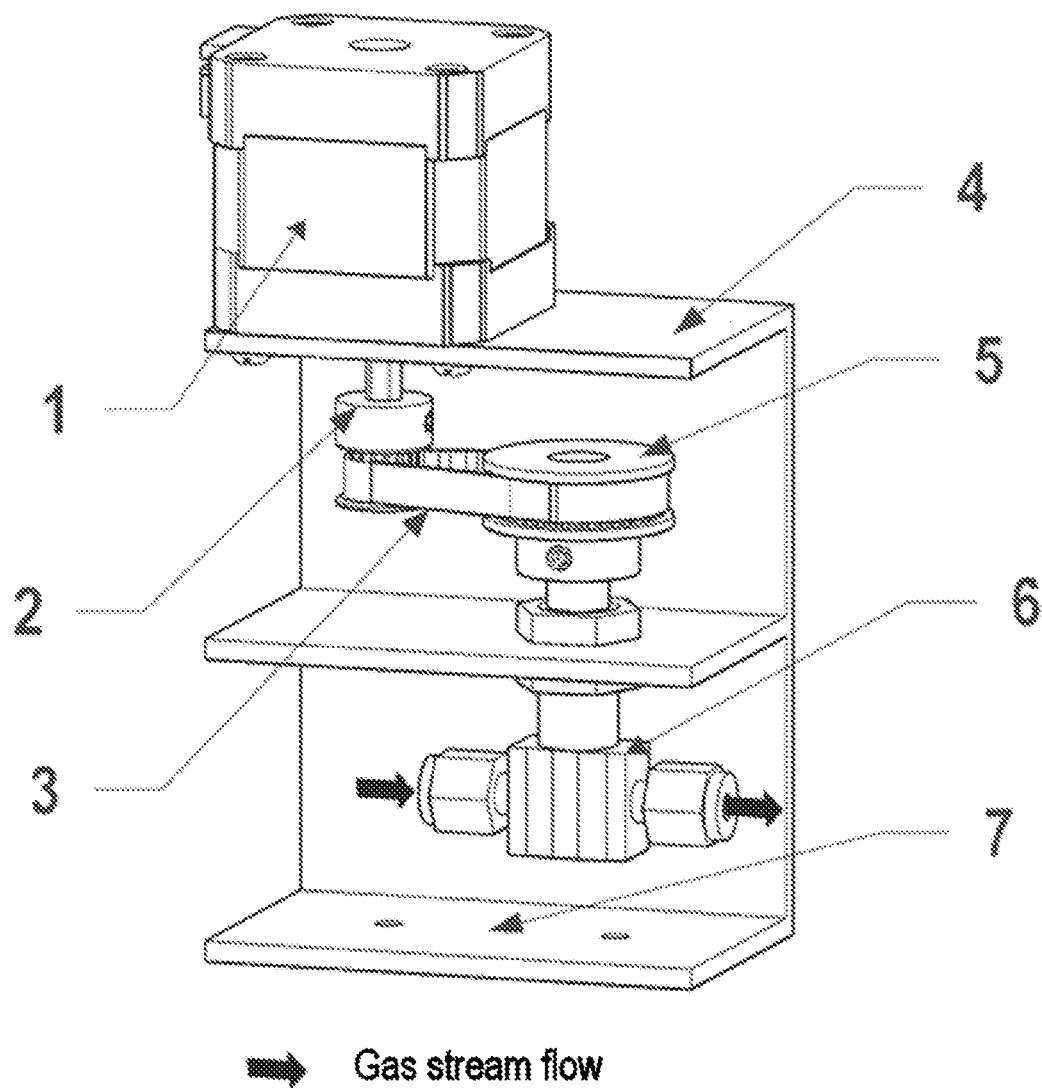
FIG. 1 illustrating a perspective view of the device of the present invention.

The micrometric valve actuator device for gas pressure control according to the present invention and illustrated in FIG. 1 comprises the following components:
- a stainless steel support (4), which has a base with holes (7), for wall mounting;
- a micrometric valve (6);
- a stepper motor (1);
- a toothed pulley with 40 teeth (5);
- a toothed pulley with 20 teeth (2);
- a toothed belt with 2 mm spacing between the teeth and 6 mm thickness (3) connects the two pulleys, allowing the transfer of movement from the stepper motor shaft (1) to the needle valve (6), without the vertical opening movement of the needle valve (6) being impaired;
- a microcontroller board (22);
- buttons for motor manual driving (24) and (25);
- a I2C-RS485 signal converter (21);
- a stepper motor driver device (23);

As shown in FIG. 1, a stainless steel support (4), which has a base with holes (7), for wall mounting, holds tight a micrometric valve (6) and a stepper motor (1). A pulley with 40 teeth (5) is attached to the needle valve head (6). A toothed pulley with 20 teeth (2) is connected to the stepper motor shaft (1). A toothed belt with 2 mm spacing between the teeth and 6 mm thickness (3) connects the two pulleys, allowing the transfer of movement from the stepper motor shaft (1) to the needle valve (6), without the movement vertical opening of the needle valve (6) being impaired.

Figure 2:
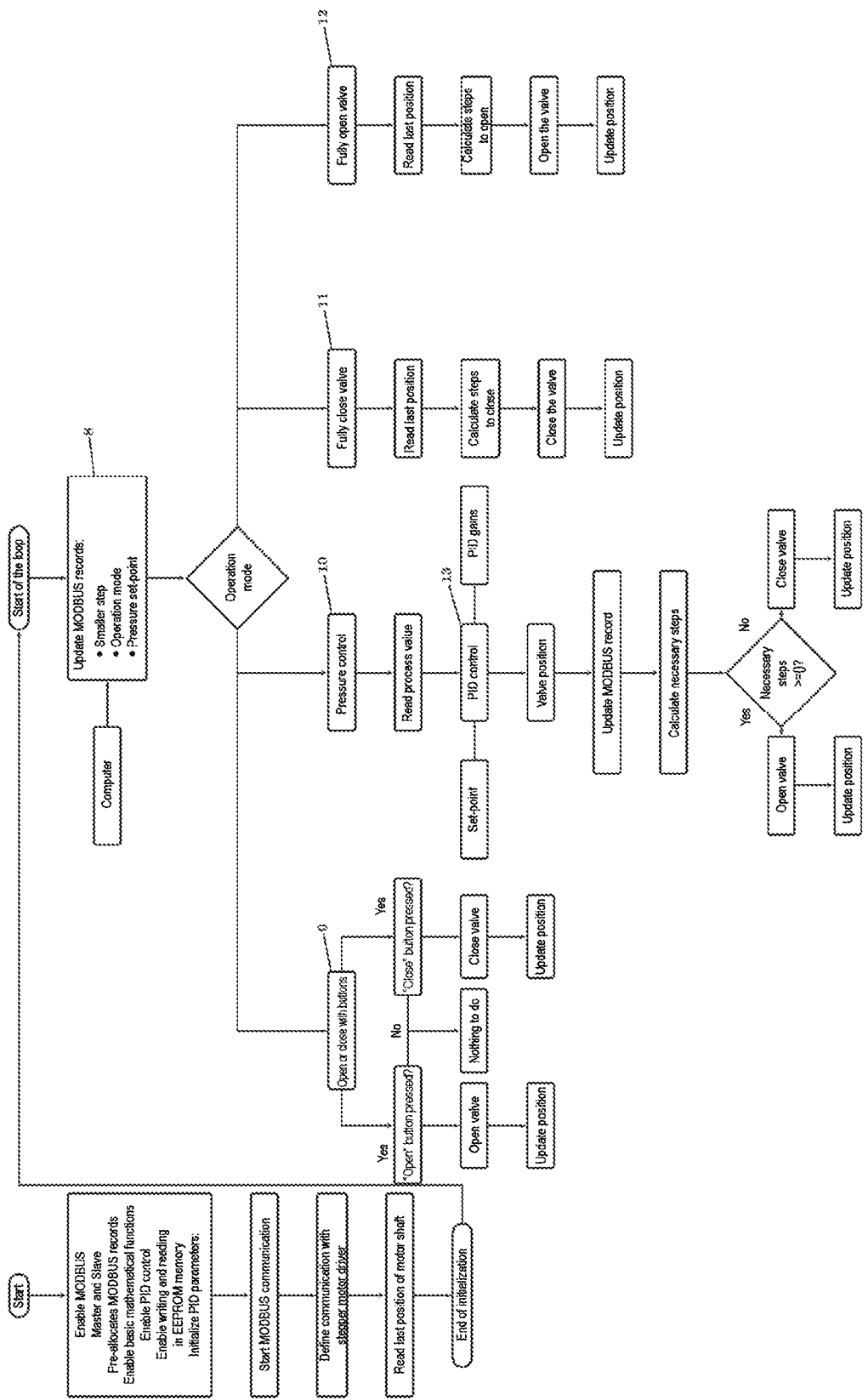
FIG. 2 illustrating a flowchart of the internal functioning of the device of the present invention.

According to FIG. 2, the stepper motor (1) is controlled by a driver device (23) with a supply voltage of 24 V, average current of 1.5 A with a peak of 1.7 A, with overvoltage and short circuit protection and optically isolated digital inputs. The device reproduces, at the specified voltage and current, the train of pulses sent by the Arduino Mega 2560 microcontroller board (22) at low current.

According to FIG. 2, the microcontroller board (22) functions as a MODBUS master and slave device, with an initialization algorithm followed by an algorithm that operates in a loop, allowing four modes of operation: control by means of buttons; operating pressure control; fully close; and fully open.

Figure 3:
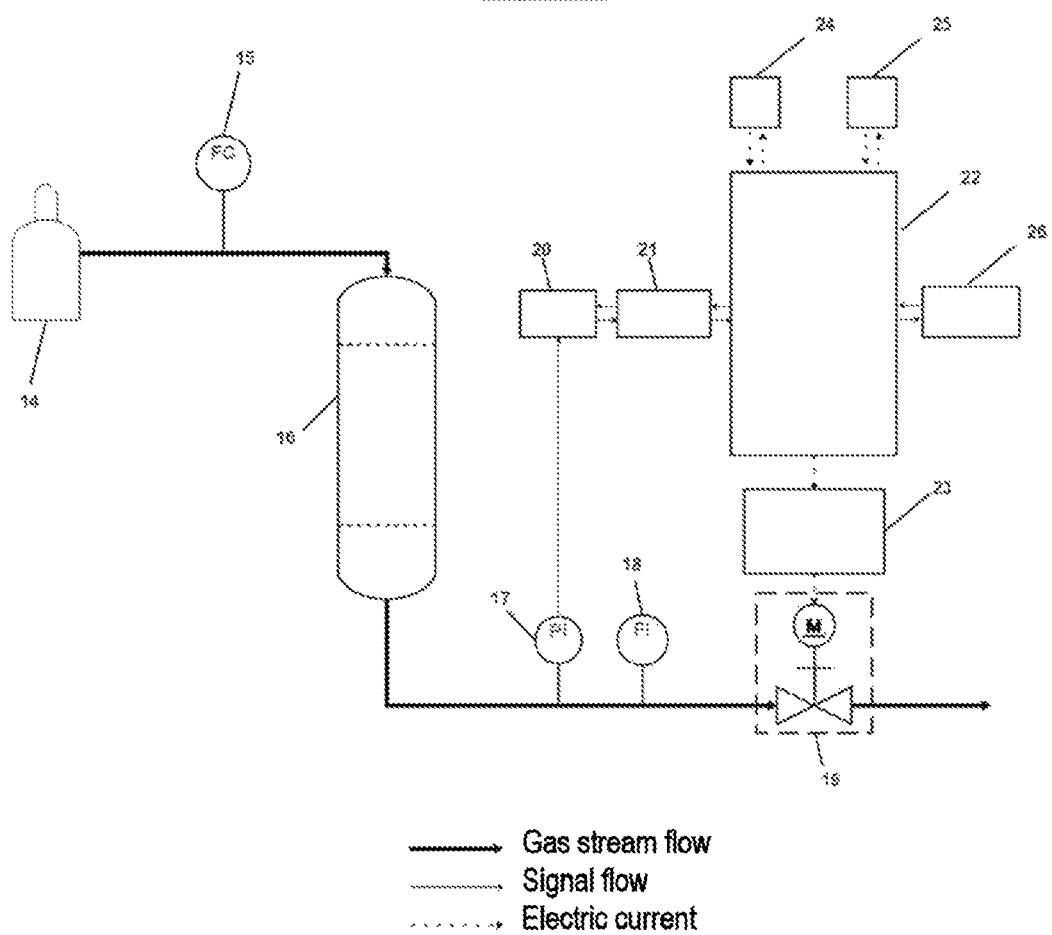
FIG. 3 illustrating a flowchart of the operation of the device in the gas adsorption unit at high pressures.

According to FIG. 3, in the button operation mode (9), two buttons, one designed to open (24) and the other designed to close (25) the needle valve, are connected to the microcontroller board (22). The microcontroller board (22) checks which button is pressed and opens or closes the valve accordingly, in the smallest number of steps previously specified (8).

In the pressure control operating mode (10), the controller requests the pressure recorded by the data acquisition module (20), by means of the I2C-RS485 converter (21), using MODBUS protocol. The pressure is recorded and compared to the set-point pressure. The pressure error is used to compute the control response by means of a PID controller with anti-windup mechanism (13).

In the fully close operation mode (11), the controller checks the valve position and returns to the position determined as zero.

In the fully open operating mode (12), the controller checks the valve position and rotates it to the position determined as fully open.

The movement of the motor shaft is controlled by a pulse train with variable frequency, which allows acceleration to the desired rotation, stabilization and deceleration until reaching the required number of steps.

As shown in FIG. 3, the device is installed in an adsorption module at high pressures that has a gas cylinder (14), a mass flow rate controller (15), an adsorption bed (16) at high pressures, a pressure transducer (17), a mass flow rate indicator (18) and the present invention (19).

Figure 4:
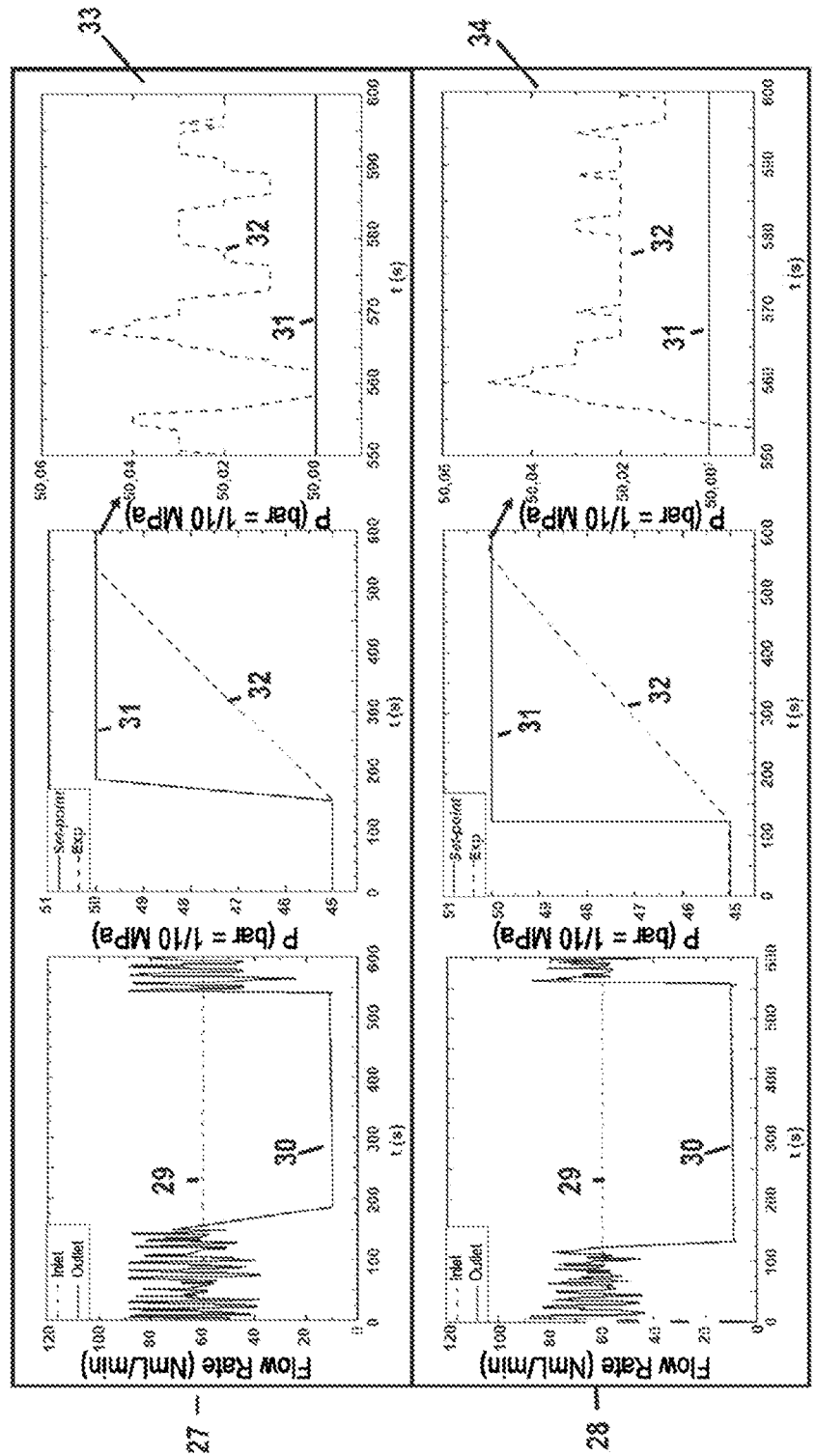
FIG. 4 illustrating the pressure response during pressurization in an adsorption unit at high pressures, when the device is installed.

In FIG. 4, there is shown that the bed pressure is controlled when it contains methane (27) or a mixture of methane with carbon gas (28). When changing the set-point pressure (31), the micrometric valve (6) is partially closed, causing the outlet flow rate (30) to be reduced. As the inlet flow rate (29) remains constant by means of the mass flow rate controller (15), there is an increase in the gas pressure (32) inside the adsorption bed (16). When the gas pressure (32) approaches the value of the Set-point (31), the micrometric valve (6) partially opens, causing the outlet flow rate (30) to increase, regulating the pressure inside the bed of adsorption (16) at pressure values that differ from the Set-point value by a maximum of 0.06 bar (6 kPa), as indicated in (33) for methane gas and in (34) for the gaseous mixture of methane and carbon gas.

EXAMPLES

The following examples are presented in order to illustrate some particular embodiments of the present invention, and should not be interpreted as limiting the same. Other interpretations of the nature and mechanism of obtaining the components claimed in the present invention do not alter the novelty thereof.

The experiments performed can be seen in FIGS. 3 and 4.

As shown in FIG. 3, the device was installed in an adsorption module at high pressures that has a gas cylinder (14), a mass flow rate controller (15), an adsorption bed (16) at high pressures, a pressure transducer (17), a mass flow rate indicator (18) and the present invention (19).

In FIG. 4, there is shown that the bed pressure is controlled when it contains methane (27) or a mixture of methane with carbon gas (28). Initially, the gas is flown with a well-defined initial flow rate and, at a given moment, the Set-point pressure is changed. When changing the Set-point pressure (31), the micrometric valve (6) is partially closed, causing the outlet flow rate (30) to be reduced. As the inlet flow rate (29) remains constant by means of the mass flow rate controller (15), there is an increase in the gas pressure (32) inside the adsorption bed (16). When the gas pressure (32) approaches the value of the Set-point (31), the micrometric valve (6) partially opens, causing the outlet flow rate (30) to increase, regulating the pressure inside the bed of adsorption (16) at pressure values that differ from the Set-point value by a maximum of 0.06 bar (6 kPa), as indicated in (33) for methane gas and in (34) for the gaseous mixture of methane and carbon gas.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A system comprising:
   an adsorption bed;
   a micrometric valve at an outlet of the adsorption bed, the micrometric valve comprising a valve head and a valve body; and
   a micrometric valve actuator coupled to the micrometric valve, the micrometric valve actuator comprising:
      a stepper motor;
      a stainless steel support having a base with holes for wall fixing, the stainless steel support configured to fix the stepper motor and the micrometric valve;
      an actuation system comprising a first toothed pulley coupled to the valve head, connected by a toothed belt to a second toothed pulley configured to transfer of movement from a stepper motor shaft to the micrometric valve;
      a microcontroller board;
      buttons for manually driving the stepper motor;
      a signal converter; and
      a stepper motor driver device.

2. The system according to claim 1, wherein the first toothed pulley defines 40 teeth and the second toothed pulley defines 20 teeth.

3. The system according to claim 1, wherein the toothed belt is a toothed belt with 6 mm thickness and 2 mm spacing between teeth.

4. The system according to claim 1, wherein the micrometric valve is a needle valve.

5. The system according to claim 1, wherein the stepper motor driver device comprises an Arduino Mega 2560 microcontroller board, and wherein the signal converter comprises an I2C-RS485, the stepper motor driver device configured to request, by the signal converter, a pressure recorded by a data acquisition module.

6. The system according to claim 1, wherein the microcontroller board provides operating modes to of the micrometric valve actuator, the operating modes including: open or close with buttons, pressure control, fully close valve, and fully open valve.

7. The system according to claim 6, wherein the micrometric valve actuator is configured to operate in pressure control mode, using a PID controller with anti-windup mechanism, wherein the micrometric valve actuator is configured to control a pressure inside the adsorption bed when the adsorption bed is pressurized with gases present in natural gas.

* * * * *